April 15, 1930. E. L. CONNELL 1,754,222
ELECTRIC DRILL
Filed Feb. 13, 1928
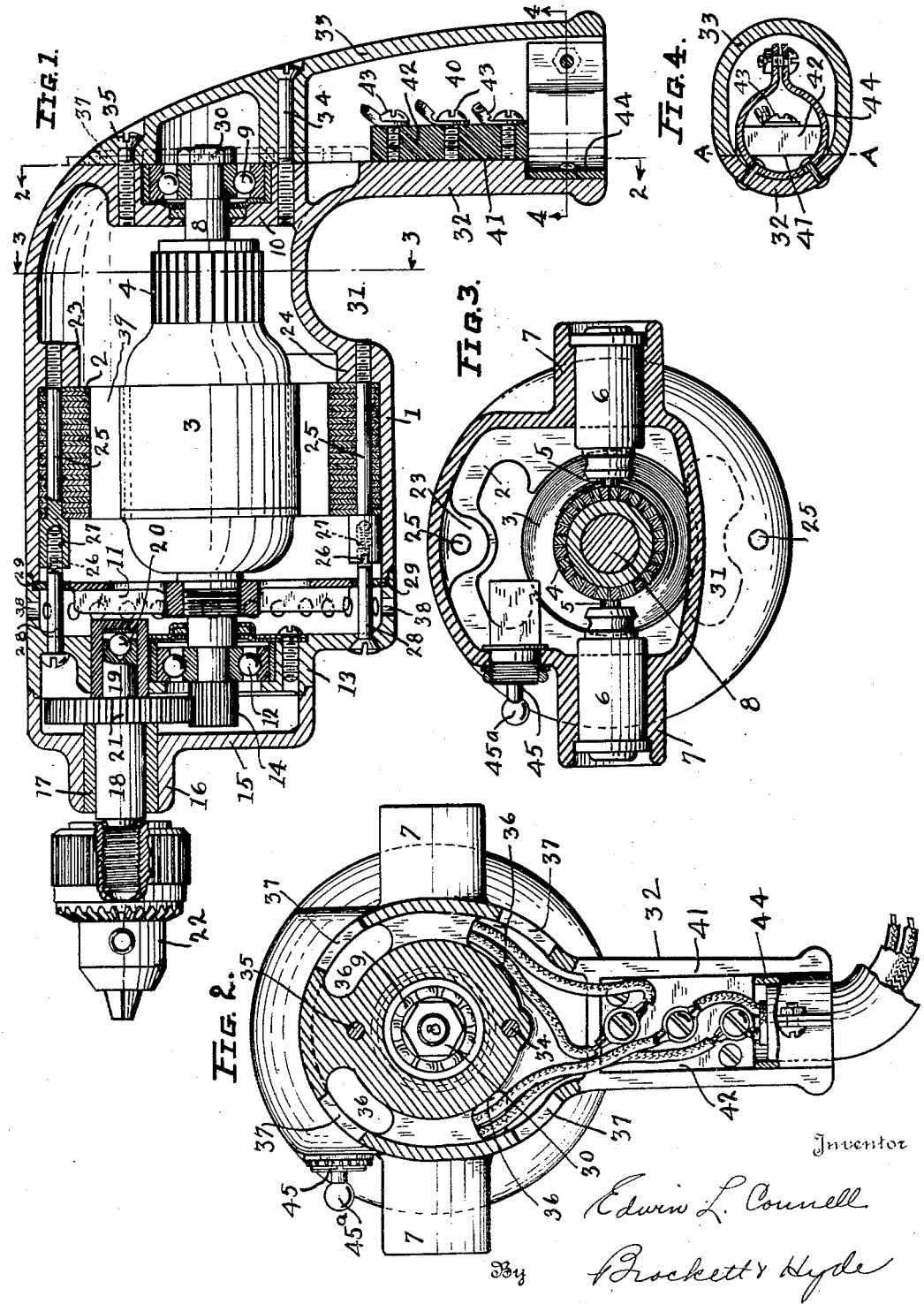
Inventor
Edwin L. Connell
By Brockett & Hyde
Attorneys Patented Apr. 15, 1930

1,754,222

UNITED STATES PATENT OFFICE

EDWIN L. CONNELL, OF CLEVELAND, OHIO, ASSIGNOR TO THE VAN DORN ELECTRIC TOOL COMPANY, OF CLEVELAND, OHIO, A CORPORATION OF OHIO

ELECTRIC DRILL

Application filed February 13, 1928. Serial No. 254,018.

This invention relates to portable electric tools, the object of the invention being to provide an improved tool which is very compact and of small size both to reduce cost and so that its weight is not tiring to the operator, and which tool is of the pistol grip type, with the motor casing of modified form to provide extra space for the fingers in holding the tool and to keep the center of gravity of the entire instrument close to the hand to reduce strain on the wrist and enable the arm effort to be applied to the tool more nearly in line with the tool spindle axis. A further object is to simplify and improve the manner of connecting the various parts, to eliminate or reduce external projections and avoid injury to the hands. Still another object is to provide for ventilation of the motor by special modification of the form and arrangement of the pistol handle and motor housing, and to take care of the motor leads and connections and provide for convenient manipulation and inspection thereof.

Further objects of the invention are in part obvious and in part will appear more in detail hereinafter.

In the drawings, which represent one suitable embodiment of the invention, Fig. 1 is a longitudinal sectional elevation; Fig. 2 is a cross section on approximately the line 2—2, Fig. 1; Fig. 3 is a cross section on the line 3—3, Fig. 1; and Fig. 4 is a detail section on the line 4—4, Fig. 1.

The tool shown in the drawings, generally speaking, includes a motor and frame, with a manipulating handle secured at its rear end, and reducing gearing and a tool spindle mounted at its forward end. The motor and frame, therefore, may be considered as a base or body to which the other parts are applied, and for convenience, and not in any sense of limitation, will be so described.

The motor includes a hollow casing or housing 1 in which are mounted the field magnet 2 and rotor 3, the latter having a commutator 4 cooperating with yielding brushes 5 supported in sleeves 6 carried by lateral cylindrical extensions 7 of the motor housing. At its rear end the motor shaft 8 rotates in a ball bearing 9 pressed into a wall 10 of the housing, while at its front end the motor shaft is provided with a fan 11 and beyond the same is journalled in a ball bearing 12 pressed into a cap 13, and beyond the cap is provided with a small pinion 14 enclosed by the end cover or head 15 having a nose 16 in a bushing 17 of which the tool operating spindle 18 is rotatable. Said tool spindle at its rear end has a reduced extension 19 socketed to receive the ball thrust member 20 and carries a gear 21 driven by the pinion 14. At its outer end the spindle is provided with any suitable chuck or tool holding part 22. The particular chuck shown is a jaw chuck adapted to receive a drill or like tool, but the tool as a whole may be equipped or arranged for other uses, such as for operating a screw driver bit, a socket wrench, or, in fact, any other part commonly driven by these portable tools.

The laminations of field magnet 2 are clamped to the motor housing, which is provided with an internal boss 23 and opposite the same with a thickened boss 24 into which are screwed two opposite clamping bolts 25. The heads thereof are somewhat enlarged and are provided with screw driver slots 26 and also with threaded sockets 27 into which are threaded clamping screws 28 for holding the closure 13 to the housing. Between said closure and the housing is located a washer-like annulus 29, through openings in which the bolts 28 extend.

This arrangement forms a very convenient assembly for the front end of the tool. The field laminations may be tightly clamped to their seats by the bolts 25; the rotor may be assembled with the closure 13 by inserting the ball bearing 12 and securing the pinion 14 in place; said end closure may be applied to the casing body with the far end of the rotor shaft passing through the ball bearing 9; and the closure 13 may be secured to the motor casing. The motor shaft is held in place by the clamping nut 30.

The motor casing or housing is of special form, modified to form a part of the handle. Ordinarily, in these small motors, the commutator end of the housing is of cup or bell form, and the handle of a tool of this kind is usually secured to the motor beyond the end of the motor shaft, with the bell of complete form all the way around. In the present construction, the motor housing has been hollowed out or recessed in the transverse zone of the commutator and of brushes 5 to form an externally concave or re-entrant recess, marked generally 31 in Fig. 1. Such a recess is possible at this particular location longitudinally of the rotor because the brush holding members 7 may be located horizontally with the recess beneath them.

The motor housing is further provided with means forming a handle of pistol type, so formed and proportioned as to enable the fingers which are clasped around it to lie in the recess 31. As illustrated, the handle is in two parts, one of which, marked 32, is shown as an integral downward extension or tongue of the motor housing, while the other, marked 33, is a hollow casting provided with pierced bosses for two clamping screws 34, 35 threaded into the wall 10 of the casing. Said wall, as shown in Fig. 2, is provided with a plurality, four being shown, of through openings 36, and the edge of the handle member 33, adjacent said openings, is slotted or recessed along the parting line of the two handle parts to form slots or openings 37, four of which are shown. The openings 36, or any of them, serve for the passage of lead wires to the field coils, brushes and other internal motor parts, (the field coils being omitted for simplicity of illustration), and said openings also serve for ventilation. For this purpose, the forward closure 13 is provided with a number of circumferentially distributed ports 38, although such openings may be located in any convenient place at the front end of the tool. The chamber 39 within the motor therefore communicates with the atmosphere at the front end of the tool through the openings 38, and at the rear end of the tool through the openings 36 and slots 37, and also through the chamber 40 through the hollow handle. Air can circulate in either direction through these internal passages or channels, according to which way the blades of fan 11 are turned.

The parting plane between the two handle parts is indicated by the line A—A, Fig. 4. It is a plane that extends from the lower end of the handle nearly to the top of the tool. The inner handle part 32 is a part of the motor housing. It is made fairly substantial and also serves to support the current leads, for which purpose it is thickened to provide a seat 41, on which is clamped an insulating block 42 to which the binding posts 43 are connected. Outwardly of said insulating block a split ring 44 is riveted or otherwise secured to the handle member 32, said ring serving as a clamp for the cable conductor.

The controlling switch, indicated generally at 45, may be any standard switch, and is shown as a toggle type switch. It is located in a wall of the housing just above one of the brush holding extensions 7, and with its handle 45ª in a re-entrant recess of the housing.

In use, the tool is held with the middle, third and fourth fingers clasped around the handle, with the middle finger lying in the recess 31. The thumb and first finger are laid along the top of the tool, one on either side, just above the brush extensions 7. This brings the thumb into the region of the switch 45 so that the latter may be readily actuated by the thumb without shifting the hand upon the tool. Moreover, the palm or fleshy part of the hand between the thumb and first finger is brought into a position opposite the rear end of the motor shaft and fairly close to the axis of the tool spindle. The net effect is to apply the hand to the tool fairly close to its center of gravity, so that the leverage of the tool is short and the muscular supporting effort of the hand and wrist is reduced. Taking into consideration the reduction in weight possible by the compact arrangement, the tool may be used by an operator for long periods without material muscle fatigue.

The ventilating channels and passages include the handle, so that the latter, as well as all motor parts, is kept cool. Moreover, the handle is divided unequally and the removable part is the larger, so that when it is taken off, all of the electrical connections and the end bearing of the motor are fully exposed and very conveniently accessible for adjustment or repair.

It will also be noted that the tool is quite free from small bosses or projections on its exterior, such as are usually provided for the securing bolts or screws which fasten the frame parts together. Indeed, the securing screws or bolts have not only been placed interiorly but also serve not only to clamp the frame parts together, but also to secure the field laminations in place.

Other advantages of the invention will be apparent to those skilled in the art.

What I claim is:

1. A portable motor tool, comprising a housing provided with brush holding members, brushes held by said members, a rotatable motor part mounted within said housing and cooperating with said brushes, and an operating spindle driven by said motor part, said housing in the transverse zone of said brush holding members being recessed to provide finger space.

2. A portable motor tool, comprising a housing provided with brush holding members, brushes held by said members, a rotatable motor part mounted within said housing and cooperating with said brushes, an operating spindle driven by said motor part, said housing in the transverse zone of said brush holding members being recessed to provide finger space, and a hand grip secured to the housing adjacent said recess.

3. A portable motor driven tool, comprising a motor housing and shaft, an operating spindle driven thereby, the rear end of the housing having opposed laterally extending brush holders and being recessed beneath the same to provide finger space.

4. A portable motor driven tool, comprising a motor housing and shaft, an operating spindle driven thereby, the rear end of the housing having opposed laterally extending brush holders and being recessed beneath the same to provide finger space, and beyond the same having an integral depending portion, and a detachable handle member secured to said depending portion.

5. A portable motor tool, comprising a motor housing and shaft, an operating spindle driven thereby, said housing having a depending tongue and a hollow handle member detachably secured to said tongue, and motor terminals located within the chamber of said hollow handle member.

6. A portable motor tool, comprising a motor housing and shaft, an operating spindle driven thereby, said housing having a depending tongue, and a hollow handle member detachably secured to said tongue, an insulating terminal block secured to said tongue and lying within the cavity of said hollow handle member, and motor terminals carried by said block.

7. A portable motor tool, comprising a motor housing and shaft, an operating spindle driven thereby, said motor housing at its rear end being provided with a cross wall having openings, the motor shaft being journalled in said wall, a ventilating fan operated by the motor shaft, and a hollow handle attached to the housing beyond said wall with its channel communicating through said openings with the fan, whereby ventilating air may be circulated through the hollow housing and handle.

8. A portable motor tool, comprising a motor housing and shaft, an operating spindle driven thereby, said motor housing at its rear end being provided with a cross wall having openings, the motor shaft being journalled in said wall, a ventilating fan operated by the motor shaft, and a hollow handle attached to the housing beyond said wall with its channel communicating through said openings with the fan, whereby ventilating air may be circulated through the hollow housing and handle, said hollow handle member being also provided with slots along its edge where it is secured to the housing.

9. A portable motor tool, comprising a motor housing having internal bosses, a field within said housing, securing bolts passing through the field and threaded into said bosses, said bolts being provided with threaded sockets, a closure for the front end of said housing carrying an operating spindle, securing screws for said closure threaded into said sockets, and a rotatable motor part within said field and actuating said operating spindle.

In testimony whereof I hereby affix my signature.

EDWIN L. CONNELL.